(12) United States Patent
Lowry et al.

(10) Patent No.: US 6,280,129 B1
(45) Date of Patent: Aug. 28, 2001

(54) EXTENSIVE ENGAGEMENT FASTENER

(75) Inventors: Joseph William Lowry, Liberty, IL (US); Eustathios Vassiliou, Newark, DE (US)

(73) Assignee: WTPA, Incorporated, Newark, DE (US)

( * ) Notice: Subject to any disclaimer, the term of this patent is extended or adjusted under 35 U.S.C. 154(b) by 0 days.

(21) Appl. No.: 09/611,134

(22) Filed: Jul. 6, 2000

Related U.S. Application Data

(60) Provisional application No. 60/171,544, filed on Dec. 22, 1999.

(51) Int. Cl.[7] ............... F16B 13/06; F16B 37/04
(52) U.S. Cl. ............... 411/55; 411/61; 411/173; 411/182; 411/542
(58) Field of Search ............... 411/55, 61, 173, 411/182, 542, 915

(56) References Cited

U.S. PATENT DOCUMENTS

| | | | |
|---|---|---|---|
| 4,500,238 | 2/1985 | Vassiliou | 411/30 |
| 4,765,788 | 8/1988 | Nowak et al. | 411/61 |
| 4,874,277 | 10/1989 | Nowak et al. | 411/61 |
| 4,941,340 | 7/1990 | Nowak et al. | 72/379.2 |
| 5,100,273 | 3/1992 | Vassiliou | 411/60 |
| 5,429,467 | * 7/1995 | Gugle et al. | 411/182 |
| 5,725,343 | 3/1998 | Smith | 411/55 |

* cited by examiner

*Primary Examiner*—Neill Wilson
(74) *Attorney, Agent, or Firm*—E. Vassiliou

(57) ABSTRACT

This invention relates to a fastener, which expands by the insertion of an expanding member, preferably a screw. The fastener comprises a substantially flat head and two expandable legs. The head has an upper side and a lower side, preferably separated by a gap. The head also has an oblong hole in which the expanding body engages for securing one object to another object. The oblong hole represents a plurality of regular generally round holes, so that it becomes easy for the fastener to be located in difficult positions of the objects to be connected. The oblong hole has sides on different planes, and each side has an edge. Preferably, at least one of the two edges contains arcs for better guidance of the expanding member. Additional engagement may be provided at lower portions of the fastener for improving pulling force and/or prevailing torque. Further, an elastic body may be integrally molded at least at the lower side of the head of the fastener, and preferably throughout the head of the fastener.

32 Claims, 3 Drawing Sheets

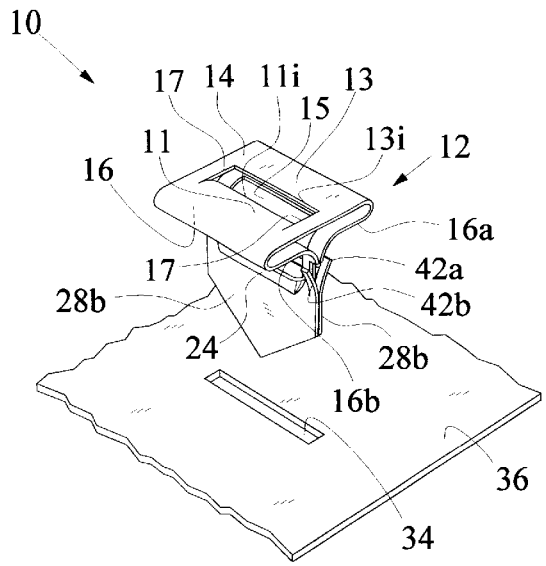
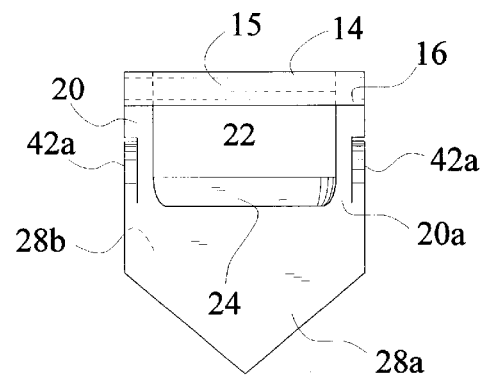
FIG. 1
FIG. 2
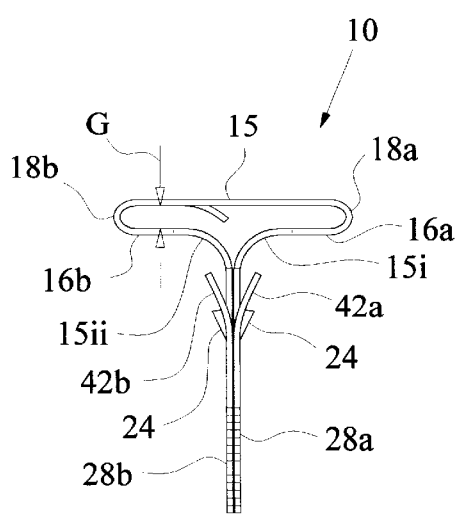
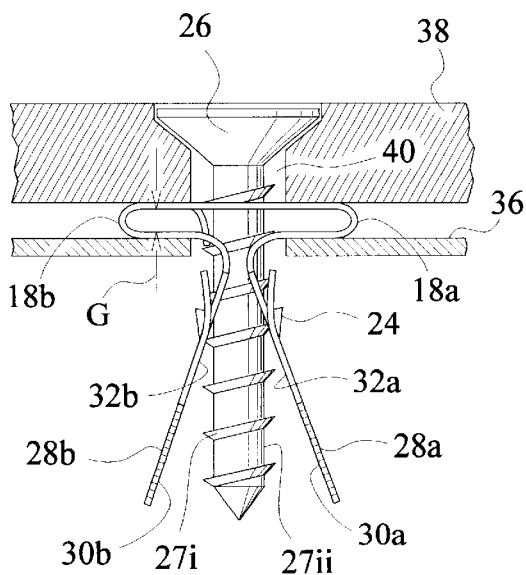
FIG. 3
FIG. 4

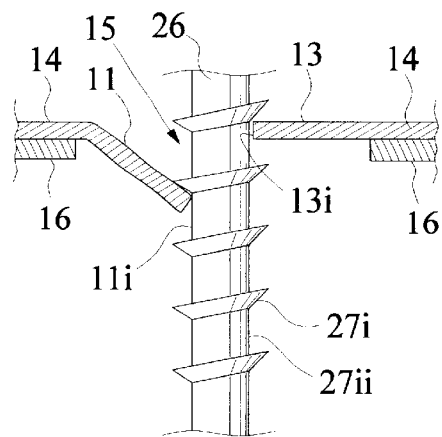
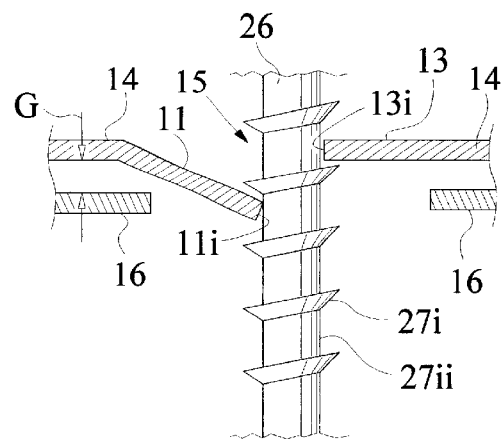
FIG. 7
FIG. 8
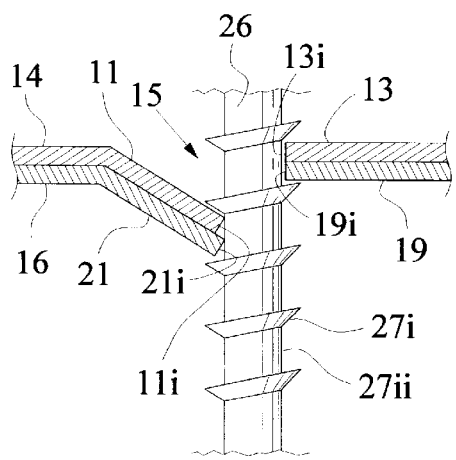
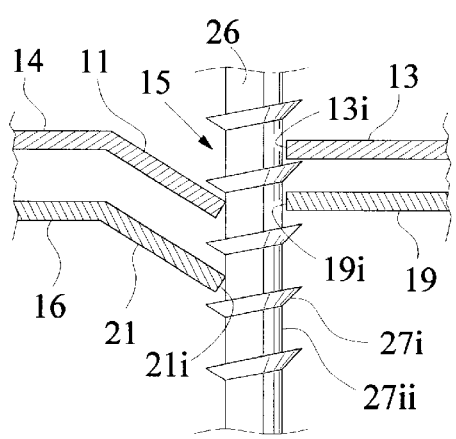
FIG. 9
FIG. 10

EXTENSIVE ENGAGEMENT FASTENER

RELATED APPLICATIONS

This application claims priority of provisional patent application No. 60/171,544, filed on Dec. 22, 1999, which is incorporated herein by reference in its entirety.

FIELD OF THE INVENTION

This invention pertains fasteners, and more particularly fasteners which have expandable legs and which attach one object to another object.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (as defined hereinbelow), as well as the pulling force (as also defined hereinbelow) of the system.

In a number of circumstances, the fastener has to be applied in difficult to reach positions and locating the engageable hole of the fastener in order to insert the expanding member becomes a difficult task for the operator.

One major object of the instant invention is to provide fasteners which are easy to install even in awkward and difficult to reach positions.

SUMMARY OF THE INVENTION

In the following text, the following comments and definitions are appropriate:

The expanding member is preferably a screw having threads and a root on which the threads are supported.

The presence of the positive engagement increases prevailing torque and/or pulling force, as compared to the same fastener lacking said positive engagement.

Prevailing torque is the torque required to render a screw loose.

Pulling force is the pulling force applied on the screw to the point of failure (usually failure occurs an the bents that join the upper side of the head and the lower side of the head).

One engagement is commensurate to another engagement if both co-operate, are substantially well aligned with respect to each other, and have the same effect on the screw.

Engageable hole or region is an at least partial hole or region which can be engaged with a screw, or similar element.

At least partial hole may be a part of a hole, such as an arc for example. However, the hole does not have to be round, and in the case of the instant invention it has an oblong shape.

Curved portion is defined as a portion having a non-linear configuration, even if it comprises smaller non-aligned linear sections, such as saw tooth for example.

Arc is defined as arc of a circle.

Pitch of a screw is defined as the distance between two consecutive threads of the screw.

This invention pertains fasteners comprising:

(a) a substantially flat head portion having an upper side, and a lower side, the upper side having a first oblong hole being engageable to an expanding member, the first engageable oblong hole having a first side and a second side opposite the first side, the first side being disposed at a first plane and the second side disposed at a second plane different than the first plane the first side having a first edge and the second side having a second edge;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and (d) an oblong funnel configuration in the vicinity of the contact region, the oblong funnel being commensurate the first oblong engageable hole.

The present invention also relates to a vehicle comprising two parts connected with a fastener, the fastener comprising:

(a) a substantially flat head portion having an upper side, and a lower side, the upper side having a first oblong hole being engageable to an expanding member, the first engageable oblong hole having a first side and a second side opposite the first side, the first side being disposed at a first plane and the second side disposed at a second plane different than the first plane the first side having a first edge and the second side having a second edge;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and (d) an oblong funnel configuration in the vicinity of the contact region, the oblong funnel being commensurate the first oblong engageable hole.

At least one of the first edge and the second edge may be linear, or curved, and may comprise arcs.

The expanding member may comprise threads, a root, and a pitch, and the first edge and the second edge may be preferably separated by a distance corresponding to the pitch of the expanding member.

The portion of the fastener under the upper side of the head may comprise an element engageable to the expanding member. Such engageable elements are described in provisional application No. 60/167,080 (Vassiliou), filed Nov. 23, 1999, No. 60/169,477 (Vassiliou), filed Dec. 7, 1999, No. 60/170,611, filed Dec. 14, 1999, and No. 60/179,834, all four of which provisional applications are incorporated herein by reference.

Also, when water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343 (Smith), and in the provisional application No. 60/170,112, filed on Dec. 10, 1999, and which provisional application is incorporated herein by reference. The elastic body forms a gasket configuration, which hermetically seals the fastener through a slot on a panel. Sealing ribs, such as described in the U.S. patent application Ser. No. 60/199,697 of Michael W. Smith and Gary John Bobeck, filed on Apr. 26, 2000, may be used to improve the sealing power of any fasteners similar to the ones of the instant invention (fasteners having for example a round hole instead of an oblong hole), including of course the fasteners of the present invention. The Provisional Application No. 60/199,697 is incorporated herein by reference.

BRIEF DESCRIPTION OF THE DRAWING

The reader's understanding of this invention will be enhanced by reference to the following detailed description taken in combination with the drawing figures, wherein:

FIG. 1 is a perspective view of a fastener according to a preferred embodiment of this invention, and a panel with a slot, on which panel the fastener is intended to fasten another object.

FIG. 2 is a front view of the type of the fastener illustrated in FIG. 1.

FIG. 3 is a side view of the type of the fastener illustrated in FIG. 1.

FIG. 4 is a cross-sectional side view of the fastener illustrated in FIG. 1 connecting two objects or panels after the legs of the fastener have been expanded by a screw.

FIG. 7 is a fractional cross sectional view of the fastener illustrated in FIGS. 1 and 5, wherein the upper side and the lower side of the head are not separated by a gap, and the first side and the second side of the oblong hole are engaged to the expanding member.

FIG. 8 is a fractional cross sectional view of the fastener illustrated in FIGS. 1 and 5, wherein the upper side and the lower side of the head are separated by a gap, and the first side and the second side of the oblong hole are engaged to the expanding member.

FIG. 9 is a fractional cross sectional view of the fastener illustrated in FIGS. 1 and 5, wherein the upper side and the lower side of the head are not separated by a gap, and the first side and the second side of the oblong hole are engaged to the expanding member, which expanding member is also engaged to the lower side of the head of the fastener.

FIG. 10 is a fractional cross sectional view of the fastener illustrated in FIGS. 1 and 5, wherein the upper side and the lower side of the head are separated by a gap, and the first side and the second side of the oblong hole are engaged to the expanding member, which expanding member is also engaged to the lower side of the head of the fastener

DETAILED DESCRIPTION OF THE INVENTION

Figure 5:
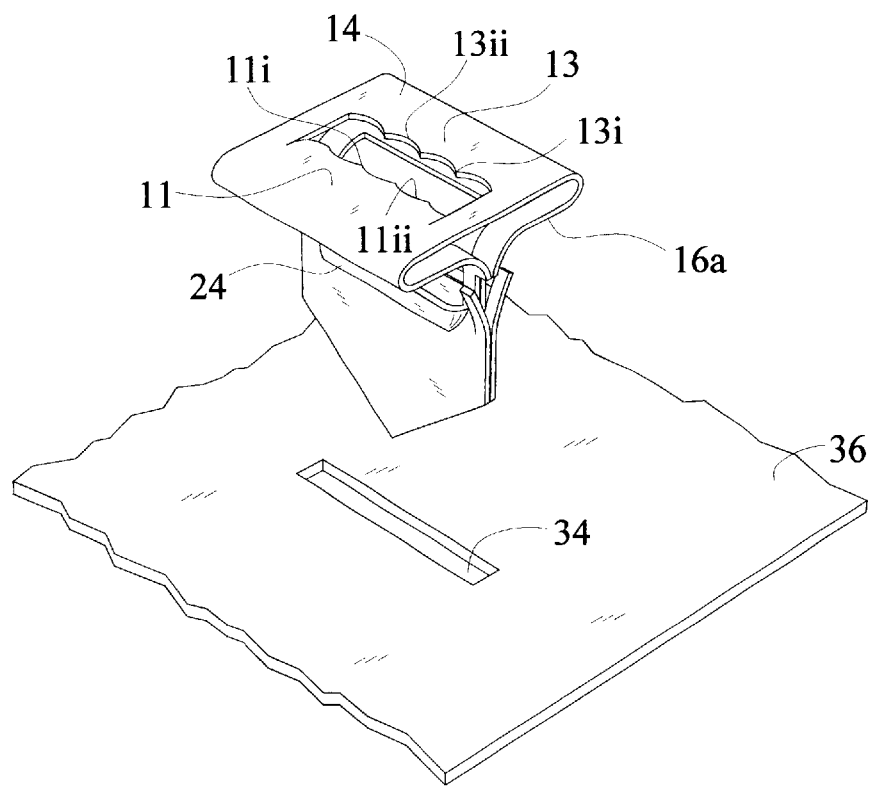
FIG. 5 is perspective view of a fastener according to another preferred embodiment of this invention, and a panel with a slot, on which panel the fastener is intended to fasten another object.

This invention pertains expanding fasteners which can secure two or more objects together, and are characterized by the fact that an operator can locate the hole in which an expanding member has to be inserted for expanding the legs of the fastener, even if the fastener has to be disposed in awkward and difficult to reach positions. An example is two automobile parts, such as a plastic panel and a metal sheet, for example, secured together. The invention also pertains vehicles comprising parts connected with the novel fasteners described herein.

Referring now to FIGS. 1 to 4, there is depicted a fastener 10 according to a preferred embodiment of the instant invention, similar in certain respects to the fasteners described in U.S. Pat. No. 4,500,238, comprising a substantially flat head portion 12. The substantially flat head portion 12 has an upper side 14, and a lower side 16.

The upper side 14 has a first oblong hole 15, which is engageable to an expanding member 26 (better shown in FIG. 4). The first oblong hole 15 has a first side 11, which in turn has a first edge 11$i$, and a second side 13, which has in turn a second edge 13$i$. The two sides 11 and 13 are on different planes, as well shown in FIG. 1. The plane on which the second side 13 resides is the same plane as the plane on which the upper side 14 of the head 12 resides. The plane on which the first side 11 resides is a plane having an inclination with respect to the plane of the second side 13. The edges 11$i$ and 13$i$ are linear in this particular embodiment. The side 11 has been made by cutting side slits 17 and bending the portion of the upper side 14, which portion corresponds to the side 11. Although the side slits 17 are desirable, they are not absolutely necessary, and the bent of the first side 11 can be realized in the absence of such side slits. The slits may also be extended toward the side 13, if so desired.

The position and distance between the two edges 11$i$ and 13$i$ are such that they correspond to the pitch of the expanding member in a manner that the expanding member becomes engageable to the oblong hole 15.

The lower side comprises a right lower side 16a and a left lower side 16b.

The upper side 14 and the lower side 16 may be separated by a gap G as better shown in FIG. 3, or they may be substantially in contact (not shown for purposes of clarity) with each other, depending on the application. The upper side 14 is connected to the right lower side 16a and the lower left side 16b through a right head bent 18a and a left head bent 18b, respectively.

The larger the gap G the larger the radius of the two bents, and therefore, the higher the pulling force which is needed to break the hardened fastener at the bent regions. However, there are occasions when a small gap or absence of a gap is necessary usually due to space requirements.

The fastener 10 further comprises a neck 20 having a cutting or opening 22 and two side neck portions 20a. The neck 20 extends from the lower side 16 of the substantially flat head portion 12 at a substantially right angle in its length with respect to the substantially flat head portion 12 of the fastener 10.

The fastener 10 also comprises two substantially flat legs, a right leg 28a and a left leg 28b, extending from the neck 20, and having inner surfaces 30a and 30b, respectively, the two inner surfaces 30a and 30b of the two legs 28a and 28b being at an initial proximity with each other, the legs being expandable in opposite directions upon inserting through and engaging to the first engageable hole the expanding member, such as screw 26 having threads 27a and a root 27b, and a pitch, thus bringing the expanding member to a contact region 32a on leg 28a and a contact region 32b on leg 28b.

At the bottom of the opening 22 there is disposed an oblong funnel 24 for guiding the expanding member 26, such as a screw 26 (see FIG. 4), for example. The oblong funnel 24 may be considered as part of the legs 28a and 28b. It may have continuous sides or multi-arc sides (not shown for purposes of clarity).

The opening 22 may have any appropriate dimensions. For example, it may have a general open shape as shown in FIG. 2, or it may be elongated, or it may be just a thin slit parallel to the plane of and adjacent to the substantially flat head portion 12. In the case that it is just a thin slit adjacent to the substantially flat head portion 12, the funnel 24 will also be adjacent to the substantially flat head portion 12, and the two side neck portions 20a will be minuscule in length from the lower side 16 to the beginning of the legs in the vicinity of the funnel 24.

In operation, the fastener 10 is inserted through slot 34 of a sheet, preferably metal sheet 36. In sequence, a panel 38 is placed on top having a panel hole 40. The expanding body, preferably screw 26, is then inserted through the panel hole 40, engages to the first oblong engageable hole 15 of the fastener, and expands the legs 28a and 28b by applying force at the contact region 32a and 32b.

Especially in cases that the connection of the two parts is positioned in difficult to reach positions, the operator is considerably helped in locating the first engageable hole 15, since this hole is oblong, and therefore, the expanding member can be inserted in a plurality of positions along the length of the oblong configuration.

Another preferred embodiment is illustrated in FIG. 5. According to this embodiment, the edges 11i and 13i are curved (containing curved portions) and/or preferably having a plurality of arcs 11ii and 13ii, respectively. These arcs preferably correspond to circles having substantially the same diameter as the diameter of the root 27ii of the expanding member 26. It is preferable that at least one of the two edges 11ii and 13ii has arcs, and more preferably that both edges have arcs. The number of arcs on each edge depends on the particular application. The larger the number of arcs, the higher the plurality of positions at which the expanding member may engage on the oblong hole 15, but the smaller the surface area of the contact of the expanding member with the edge. In the case of infinite number of arcs, the edge becomes linear and corresponds to the previous embodiment.

The importance of the presence of the arcs is based on the considerably improved guidance of the expanding member, as compared to the linear configuration. The pulling force and prevailing torque are also improved.

The operation of this embodiment is substantially identical to the operation of the previous embodiment, with the difference that the expanding member has a limited number of engagement positions within the oblong hole 15.

It is important to note that in both embodiments the resistance in pulling the expanding member away from the fastener increases as the pulling force increases due to the fact that the fist side 11 is pulled toward the plane containing the second side 13, and the distance between the two edges 11i and 13i decreases.

As aforementioned, the portion of the fastener under the upper side 14 of the head 12 may comprise an element engageable to the expanding member. Such engageable elements are described in provisional application No. 60/167,080 (Vassiliou), filed Nov. 23, 1999, No. 60/169,477 (Vassiliou), filed Dec. 7, 1999, and provisional application of Eustathios Vassiliou titled "Fastener with Multiple Positive Engagement" filed on Dec. 14, 1999, all three of which provisional applications are incorporated herein by reference.

It is evident that the embodiments of the above applications may have to be adjusted to fit the requirements of the instant invention. For example, the engageable elements of the above applications will have to have an oblong shape corresponding to the first oblong engageable hole of the upper side 14 of the fastener 12 of the present invention.

Of particular interest is the case of another preferred embodiment, wherein the engageable element to the expanding member, which is located under the upper side 14 of the head 12, is the lower side 16 of the head.

Figure 6:
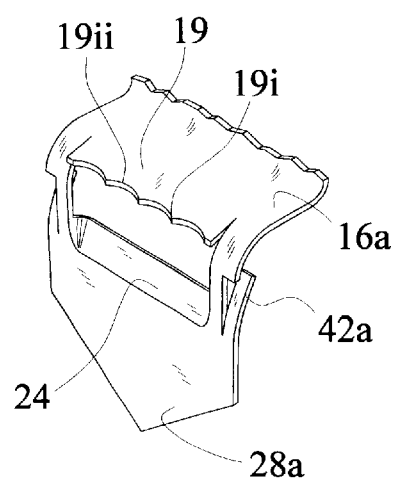
FIG. 6 is a fractional perspective view of the right leg, the side neck portion, and the right lower head side of a fastener according to the preferred embodiment of the instant invention illustrated in FIG. 5.

FIG. 6 illustrates the right lower portion of a fastener, according to this preferred embodiment, wherein the lower side 16a of the head 12 has an engageable portion 19 to the expanding member 26. The engageable portion 19 has an edge 19i an d arcs 19ii, although the edge 19i may be linear. The left lower portion of the fastener is not shown for purposes of brevity and clarity. It is in most respects a mirror image of the lower right portion, except that the respective left side of the right hole side 19 is bent as it will be shown in more detail hereinbelow.

FIGS. 7 and 8 illustrate cases in which the lower side 16 of the head 12 is not engageable to the expanding member 26. The upper side 14 is engageable by the first side 11 of the oblong hole 15, which first side is preferably bent, and the second side 14, which is preferably on the same plane as the upper side 14 of the head 12. In FIG. 7, the upper side 14 and the lower side 16 of the head 12 of the fastener 10 are substantially in contact with each other, while in FIG. 8, they are separated by a gap G.

FIGS. 9 and 10 illustrate cases in which both the upper side 16 and the lower side 14 are engageable to the expanding member 26. The upper side upper side 14 is engageable to the expanding member 26 through the first bent side 11 and the second side 13 of the oblong hole 15. Similarly, the lower side 16b of the head 12 of the fastener 10 has an engageable portion 19 with an edge 19i, and a bent engageable portion 21 with an edge 21i. The shape of the edge 21i is preferably similar and commensurate to the shape of the edge 19i, so that the two edges form a second partial engageable oblong hole, with or without arcs, similar to the arcs 13ii and 19ii (see FIGS. 5 and 6). The respective edges 11/21 and 13/19 may be engaged inbetween two consecutive threads 27i (FIG. 9) or in different (preferably consecutive) threads 27ii (FIG. 10).

The operation of the embodiment wherein there are engageable elements in portions of the fastener at location(s) under the upper side 14 of the head 15 is substantially the same as the operation of the embodiments already described with the difference that at least one additional, preferably positive, engagement takes place, providing advantages such as improved pulling force and/or prevailing torque as explained in detain in the applications which have been incorporated herein by reference.

One or more of the above embodiments may be exercised simultaneously.

Also, when water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343 (Smith), and in the provisional application of Kanubhai Manibhai Patel, Michael Walter Smith and Edward John Smith, Ser. No. 60/170,112, filed on Dec. 10, 1999, which was converted to regular application Ser. No. 09/561,505 filed on Apr. 28, 2000, and both of which provisional and regular patent applications are incorporated herein by reference.

In order to improve pulling force and/or prevailing force, the methods described in provisional application No. 60/167,080 (filed Nov. 23, 1999), No. 60/169,447 (filed Dec. 07, 1999), No. 60/170,611 (filed Dec. 14, 1999), and No. 60/179,834 (filed Feb. 02, 2000), all of Eustathios Vassiliou may be used in this case also, modified to be used for an oblong engageable hole in place of an at least partially round hole. All four provisional applications are incorporated herein by reference.

The embodiments described hereinabove serve illustration purposes only regarding this invention, which should only be bound by the claims.

Any explanations given are speculative and should not restrict the scope of the claims.

What is claimed is:

1. A fastener comprising:
   (a) a substantially flat head portion having an upper side, and a lower side, the upper side having a first oblong hole being engageable to an expanding member, the first engageable oblong hole having a first side and a second side opposite the first side, the first side being disposed at a first plane and the second side disposed at a second plane different than the first plane the first side having a first edge and the second side having a second edge;
   (b) a neck having an opening and two side neck portions, the neck extending from the lower side of the substantially flat head portion at a substantially right angle with respect to the substantially flat head portion;
   (c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and
   (d) an oblong funnel configuration in the vicinity of the contact region, the oblong funnel being commensurate the first oblong engageable hole.

2. A fastener as defined in claim 1, wherein at least one of the first edge and the second edge is linear.

3. A fastener as defined in claim 1, wherein at least one of the first edge and the second edge is curved.

4. A fastener as defined in claim 3, wherein at least one of the first side and the second side comprises arcs.

5. A fastener as defined in claim 1, wherein the expanding member has threads, a root, and a pitch, and the first edge and the second edge are separated by a distance corresponding to the pitch of the expanding member.

6. A fastener as defined in claim 2, wherein the expanding member has threads, a root, and a pitch, and the first edge and the second edge are separated by a distance corresponding to the pitch of the expanding member.

7. A fastener as defined in claim 3, wherein the expanding member has threads, a root, and a pitch, and the first edge and the second edge are separated by a distance corresponding to the pitch of the expanding member.

8. A fastener as defined in claim 4, wherein the expanding member has threads, a root, and a pitch, and the first edge and the second edge are separated by a distance corresponding to the pitch of the expanding member.

9. A fastener as defined in claim 1, wherein a portion of the fastener under the upper side of the head comprises an engageable element to the expanding member.

10. A fastener as defined in claim 2, wherein a portion of the fastener under the upper side of the head comprises an engageable element to the expanding member.

11. A fastener as defined in claim 3, wherein a portion of the fastener under the upper side of the head comprises an engageable element to the expanding member.

12. A fastener as defined in claim 4, wherein a portion of the fastener under the upper side of the head comprises an engageable element to the expanding member.

13. A fastener as defined in claim 1, further comprising an elastic body molded at least at the lower side of the head of the fastener.

14. A fastener as defined in claim 2, further comprising an elastic body molded at least at the lower side of the head of the fastener.

15. A fastener as defined in claim 3, further comprising an elastic body molded at least at the lower side of the head of the fastener.

16. A fastener as defined in claim 4, further comprising an elastic body molded at least at the lower side of the head of the fastener.

17. A vehicle comprising two parts connected with a fastener, the fastener comprising:
   (a) a substantially flat head portion having an upper side, and a lower side, the upper side having a first oblong hole being engageable to an expanding member, the first engageable oblong hole having a first side and a second side opposite the first side, the first side being disposed at a first plane and the second side disposed at a second plane different than the first plane the first side having a first edge and the second side having a second edge;
   (b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and (d) an oblong funnel configuration in the vicinity of the contact region, the oblong funnel being commensurate the first oblong engageable hole; and wherein one of the two parts comprises a slot for accepting the substantially flat legs of the fastener, and the other part comprises a hole for accepting the expanding member.

18. A vehicle as defined in claim 17, wherein at least one of the first edge and the second edge is linear.

19. A vehicle as defined in claim 17, wherein at least one of the first edge and the second edge is curved.

20. A vehicle as defined in claim 19, wherein at least one of the first side and the second side comprises arcs.

21. A vehicle as defined in claim 17, wherein the expanding member has threads, a root, and a pitch, and the first edge and the second edge are separated by a distance corresponding to the pitch of the expanding member.

22. A vehicle as defined in claim 18, wherein the expanding member has threads, a root, and a pitch, and the first edge and the second edge are separated by a distance corresponding to the pitch of the expanding member.

23. A vehicle as defined in claim 19, wherein the expanding member has threads, a root, and a pitch, and the first edge and the second edge are separated by a distance corresponding to the pitch of the expanding member.

24. A vehicle as defined in claim 20, wherein the expanding member has threads, a root, and a pitch, and the first edge and the second edge are separated by a distance corresponding to the pitch of the expanding member.

25. A vehicle as defined in claim 17, wherein a portion of the fastener under the upper side of the head comprises an engageable element to the expanding member.

26. A vehicle as defined in claim 18, wherein a portion of the fastener under the upper side of the head comprises an engageable element to the expanding member.

27. A vehicle as defined in claim 19, wherein a portion of the fastener under the upper side of the head comprises an engageable element to the expanding member.

28. A vehicle as defined in claim 20, wherein a portion of the fastener under the upper side of the head comprises an engageable element to the expanding member.

29. A vehicle as defined in claim 17, wherein the fastener further comprises an elastic body integrally molded at least at the lower side of the head of the fastener.

30. A vehicle as defined in claim 18, wherein the fastener further comprises an elastic body integrally molded at least at the lower side of the head of the fastener.

31. A vehicle as defined in claim 19, wherein the fastener further comprises an elastic body integrally molded at least at the lower side of the head of the fastener.

32. A vehicle as defined in claim 20, wherein the fastener further comprises an elastic body integrally molded at least at the lower side of the head of the fastener.

* * * * *